No. 731,189.  
PATENTED JUNE 16, 1903.
S. W. M. & G. L. KOLLOCK.
DEVICE FOR CHECKING HORSES.
APPLICATION FILED SEPT. 26, 1902.
NO MODEL.
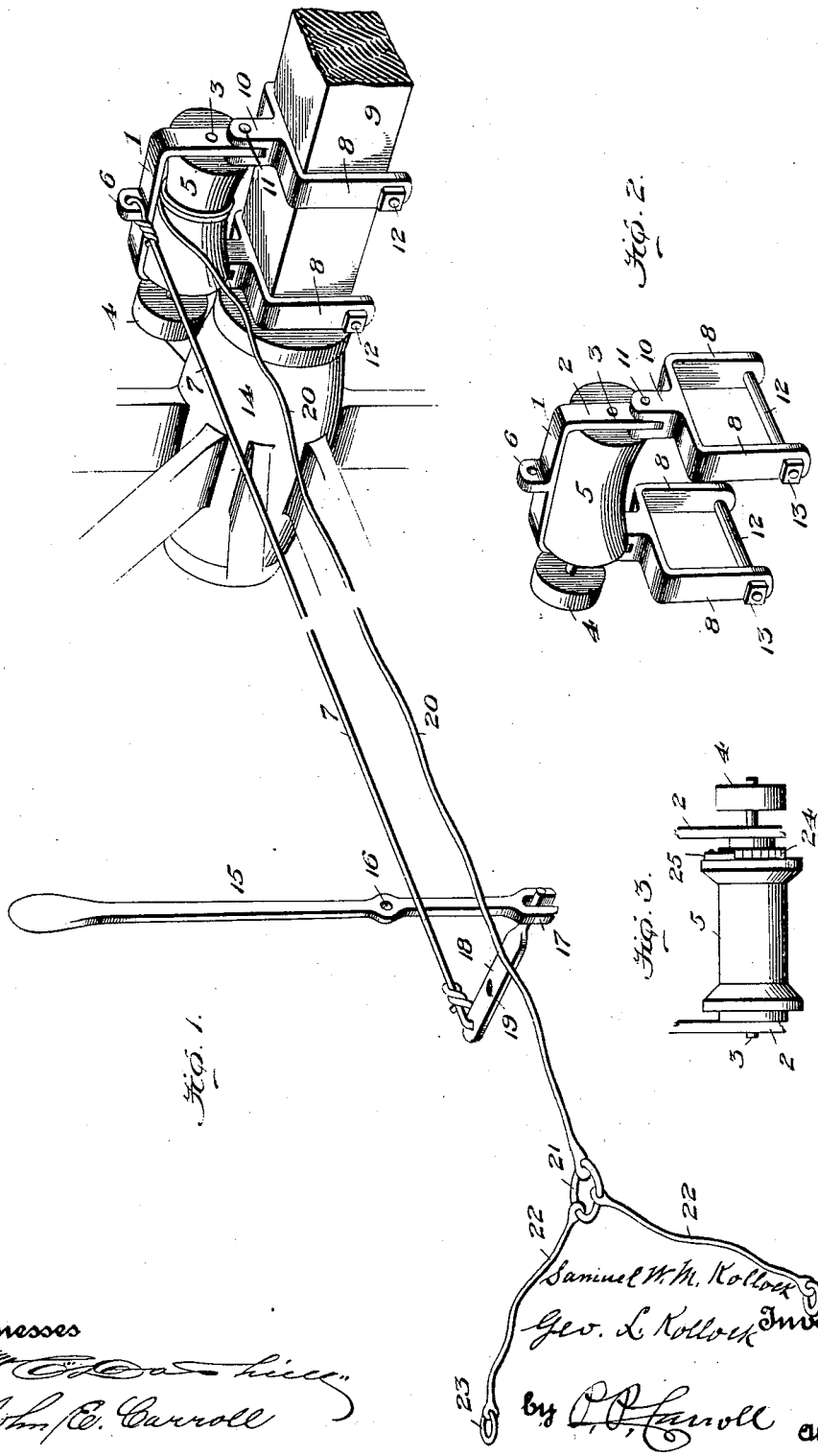

No. 731,189. Patented June 16, 1903.

UNITED STATES PATENT OFFICE.

SAMUEL W. M. KOLLOCK AND GEORGE L. KOLLOCK, OF SEATTLE, WASHINGTON.

DEVICE FOR CHECKING HORSES.

SPECIFICATION forming part of Letters Patent No. 731,189, dated June 16, 1903.

Application filed September 26, 1902. Serial No. 124,894. (No model.)

*To all whom it may concern:*

Be it known that we, SAMUEL W. M. KOLLOCK and GEORGE L. KOLLOCK, citizens of the United States, residing at Seattle, in the county of King and State of Washington, have invented certain new and useful Improvements in Devices for Checking Horses, of which the following is a specification, reference being had therein to the accompanying drawings.

This invention relates to certain new and useful improvements in devices for checking horses and preventing them from running away; and it has for its objects, among others, to provide a simple and cheap construction which can be readily applied to any vehicle and by which the animal or animals will be automatically checked when the lever is actuated to throw into contact with the hub of the wheel a friction-wheel, the latter being designed to be revolved by its contact with the hub, and thereby winding up the reins.

The device can be manufactured at small cost, can be applied by any one to the axle of a vehicle, and can be easily operated by any one on the seat of the vehicle. It is detachable and can be easily removed from one axle and placed upon another.

Other objects and advantages of the invention will hereinafter appear and the novel features thereof will be specifically defined by the appended claim.

The invention is clearly illustrated in the accompanying drawings, which, with the numerals of reference marked thereon, form a part of this specification, and in which—

Figure 1 is a perspective view showing the invention applied to the axle of a vehicle. Fig. 2 is a perspective view of the device detached ready to be applied to the axle. Fig. 3 is an elevation showing a modified form of connection between the drum and axle.

Like numerals of reference indicate like parts in the different views.

Referring to the drawings, 1 designates a yoke, in the parallel side portions 2 of which is mounted to revolve a shaft or axle 3, one end of which is extended, and upon the extended portion is fast a friction-wheel 4. Upon the said shaft between the side portions is a pulley 5, which is preferably concaved, as shown. The top bar of the yoke is formed or provided with an eye or the like 6 for the attachment of one end of a cord or wire 7.

8 designates clips adapted to embrace the axle 9 adjacent to the hub end, and these clips are formed at their upper portions with the ears 10, in which the lower ends of the side portions of the yoke 1 are received and in which they are pivotally mounted by suitable pins or the like 11. The lower ends of the parallel portions of the clips are secured together beneath the axle by suitable bolts 12, provided with nuts 13, as shown. The yoke is disposed near the hub, so that the friction-wheel will contact with the said hub 14 when the yoke or frame is turned on its pivots by means of the lever 15, which is pivotally mounted, as at 16, its lower end being provided with the yoke or bifurcation 17, which loosely receives the end of the arm 18, pivoted between its ends, as at 19, on any suitable support, and to the other end of this arm is connected the other end of the rod or bar or wire 7, as shown.

20 is a cord or the like having one end fast to the pulley 5 and designed to be wound upon said pulley, the other end being connected to a ring or eye 21, from which branch the reins or the like 22, and provided with the eyes or rings 23, to be connected with the horse's bit. (Not shown.) When more than one horse is used, the cord or cable can be attached to each horse's bit, as will be readily understood.

The operation will be readily understood. Normally the parts are in the position in which they are shown. Should the horse start to run, the brake is applied, or, in other words, the lever is moved so as to throw the friction-wheel down into contact with the hub of the wheel, and when the same is in contact with the wheel-hub the friction-wheel will be revolved thereby, and thus the cable or cord will be wound upon the pulley and the drawing of the same on the horse's bit will check him and cause him to stop.

The device takes up but little room, is not noticeable when in position, and adds but little weight to the vehicle.

When the animal has stopped or been checked, the lever is moved to bring the friction-wheel away from the hub and the cord or cable is loosened ready for another application of the friction-wheel should the horse start to run away.

In Fig. 3 is shown a construction whereby the drum can be thrown out of operation while the vehicle is being moved backward. This consists of a ratchet-wheel 24, which is keyed to the shaft 3 and is adapted when moved in one direction to engage a dog 25, pivoted to one end of the drum 5. It will thus be seen that when the vehicle is backed the shaft 3 is permitted to revolve within the drum 5 without operating the same.

What is claimed as new is—

The combination with the axle and the wheel-hub, of clips embracing the axle and provided with upwardly-extending ears, a yoke having its depending portions received between and pivotally mounted on said ears, said yoke being provided with an eye upon its upper face, a rod connected to said eye, a horizontal lever pivotally mounted between its ends and having one end connected to said rod, a vertically-disposed lever pivoted between its ends and having at its lower end a yoke receiving the other end of said lever, a shaft mounted in the vertical portions of the yoke, a pulley on said shaft within the yoke, a friction-wheel on the extended end of said shaft to bear upon the wheel-hub and a cord wound upon said pulley and having means for attachment to the horse's bit, all substantially as shown and described.

In testimony whereof we affix our signatures in presence of two witnesses.

SAMUEL W. M. KOLLOCK.
GEO. L. KOLLOCK.

Witnesses:
P. P. CARROLL,
JOHN E. CARROLL.